United States Patent [19]

Bickmore et al.

[11] Patent Number: 5,301,532

[45] Date of Patent: Apr. 12, 1994

[54] TUBE PIERCING AND FLUID IRRIGATION DEVICE

[76] Inventors: Carl E. Bickmore, 5 Shamrock Rd., South Burlington, Vt. 05403; Larry F. Langlais, 189 Federal St., St. Albans, Vt. 05478

[21] Appl. No.: 14,718

[22] Filed: Feb. 8, 1993

[51] Int. Cl.$^5$ .............................................. B21D 28/28
[52] U.S. Cl. ...................................... 72/325; 72/409; 72/413; 72/473; 137/318
[58] Field of Search ................ 72/409, 410, 325, 473, 72/413; 29/890.14, 890.148, 890.144, 432.2, 270, 282, 283.5; 137/15, 318

[56] References Cited

U.S. PATENT DOCUMENTS

| 1,625,064 | 4/1927 | Vello | 72/409 |
| 2,289,637 | 7/1942 | Ernest | 72/409 |
| 2,762,414 | 9/1956 | Demler | 72/413 |
| 3,395,724 | 8/1968 | Hamel | 137/318 |
| 3,509,905 | 5/1970 | Mullins | 72/325 |
| 3,698,419 | 10/1972 | Tura | 137/318 |
| 4,955,406 | 9/1990 | Antoniello | 137/318 |

FOREIGN PATENT DOCUMENTS

| 2413291 | 10/1975 | Fed. Rep. of Germany | 29/890.148 |
| 579148 | 7/1946 | United Kingdom | 72/413 |

Primary Examiner—Daniel C. Crane
Attorney, Agent, or Firm—John J. Welch

[57] ABSTRACT

The instant device serves to pierce and irrigate fluid filled tubing. It consists of an upper jaw and a lower jaw mounted on locking pliers. The upper jaw consists of an upper jaw mounting plate fastened to the upper jaw of the locking pliers and a piercing pin unit, along with a replaceable hollow press fit piercing pin held within such unit which piercing pin unit is held in the upper jaw mounting plate after the unit's insertion through a metallic washer locking cushion. The device's lower jaw consists of a lower jaw tube cradle component mounting plate fastened to the lower jaw of the locking pliers and further consists of a tube cradle component with eight cylindrically shaped notches for receipt of any one of six different sizes of cylindrically shaped tubing. The tube cradle component is held to the lower jaw tube cradle component mounting plate by way of a threaded retaining shoulder bolt. The tube cradle component is amenable to being so held from either of its ends and it can be rotated through 360 degrees and further held fast in any one of eight positions so that one of the eight cylindrically shaped receiving notches is aligned with the tip of the replaceable hollow press fit piercing pin by way of a springloaded detent screw that is insertable into a tapped hole in the lower jaw tube cradle component mounting plate and that further fits into any one of eight detent screw holes, four in the front face of the tube cradle component and four in its posterior face. A piece of tubing held in the receiving notch of desired diameter positioned in alignment with the tip of the press fit piercing pin, by way of appropriate rotation of the tube cradle component and then a fastening of the appropriate face of the tube cradle adjacent the front face of the lower jaw tube cradle component mounting plate, is pierced by the piercing pin protruding through a replaceable rubber sealing gasket affixed into a counterbore in the base of the upper jaw mounting plate.

16 Claims, 5 Drawing Sheets

TUBE PIERCING AND FLUID IRRIGATION DEVICE

BACKGROUND OF THE INVENTION

1. Field of the Invention

The instant invention relates in some respect to those various tools and devices as serve to crimp, perforate, pierce and/or irrigate pipes, canisters, tubing and the like.

2. Possible Prior Art

Some art that may perhaps relate in some way to the instant invention would perhaps be the those items to be found in i.e., classes/subclasses: 30/363, 62/77; 529; 531, 72/409, 81/418-426.5, 222/83.5, 89, to wit:

| Inventor | Invention | Patent No. | Date |
| --- | --- | --- | --- |
| 1. Diggs | Irrigation Apparatus | 4,017,958 | 4/19/77 |
| 2. E. Granberg | Combined Rivet Punch and Spinner | 3,156,087 | 11/10/64 |
| 3. T. W. Brooks | Dispensing Device | 3,147,887 | 9/8/64 |
| 4. M. Kamla | Perforating Device for Deflating Cans | 3,296,696 | 1/10/67 |
| 5. S. A. Motches Et Al | Replaceable Die Nest Crimping Tool | 2,838,970 | 6/17/58 |
| 6. Rodgers | Tool for Attaching and Detaching Spring Clip from Shaft | 4,697,483 | 10/6/87 |
| 7. J. A. Cashion | Pivoted Tool Having a Wedge-Shaped Jaw Portion for Engaging a Tie Rod Sleeve | 3,336,825 | 8/22/67 |
| 8. Lowther | Mechanic's Tubing Plug | 4,982,631 | 1/8/91 |
| 9. Villazon | Hand Tool | 4,041,740 | 8/16/77 |
| 10. Robertson et al. | Refrigerant Charging Tool | 4,852,769 | 8/1/89 |

SUMMARY OF THE INVENTION

1. Brief Description of the Invention

The instant invention is a device that is particularly well suited for serving to pierce and irrigate tubing filled with gas or liquid. It is intended for use primarily for the purpose of evacuating Freon gas found within the tubing lines of refrigerating and air conditioning equipment. It consists of a tube piercing assembly permanently affixed to the jaws of conventional locking pliers to which assembly a vacuum line can be readily attached and detached.

2. Object of the Invention

It is clearly undesirable from an environmental point of view for Freon gas to be found wending its way into the earth's atmosphere. Instances of this sort of environmental damage have been found to present a clearly apparent hazard to, for instance, the ozone layer in the earth's upper atmosphere. It is consequently imperative that efficacious means be resorted to in order to berid our environment, as best possible, of a significant source of Freon, to wit, the Freon in old refrigerators, old air conditioners and any other type of Freon gas loaded refrigeration units, before, by virtue of the operation of such forces as corrosion over time of metal tubing or man's desire to simply reclaim old metallic parts for recycling purposes, such gas simply diffuses or is otherwise carelessly released into the atmosphere without regard to environmental safety concerns. Currently, there are means by which refrigerator tubing filled with the gas in old discarded refrigerating units can be irrigated and the gas captured. But, such means are often relatively quite expensive and time consuming. For example, it always takes two hands working diligently to get at hard to reach old convoluted gas filled refrigeration tubing to be found within the confines of old refrigeration units in hard to reach places such as, around corners, through narrow spaces and the like. Such work is currently performed, utilizing so called line-tap valve units that are capable of piercing tubing but which make holes in the tubing so pierced for purposes of such irrigation that are quite a bit smaller than the holes that are made when the instant invention is utilized for such purposes. Furthermore, such line-tap valve units are two piece units that require relatively time consuming assembly before and disassembly after any use of such units for purposes of such piercing and irrigation. It is necessary to remove a line-tap valve unit from its containment box. It must be taken apart and each half of the line-tap valve unit thereafter reassembled so as to then hold tubing between each half, by way of resort to screws leading from each half and pressed against the held tubing. The tubing must be tightly secured, then a piercing pin component at one end of a vacuum line must be screwed into the tubing prior to commencement of a process of gas evacuation. Likewise, such devices are really not very dependable in terms of any contemplated repeated use for such purposes. There is invariably always a problem with piercing pin breakage with but limited use as well as with deterioration of seals otherwise serving to prevent gas leakage during irrigation which deterioration can occur over only a short spanse of time. Hence, repair and replacement of parts loom as ever present problems. Also, with such devices, as was earlier pointed out, workmen are forced to carefully pick and choose where within a refrigeration unit to grasp a particular piece of tubing in order to optimize, as best possible, irrigation of the same. More often than not, an area within such old refrigeration units large enough to accommodate two hands (one person's hand to maneuver the cumbersome device, the same person's other hand or another person's hand to effectuate piercing) is required for such purposes. Also, at times when such undertakings must be accomplished but the weather is cold, for example, in the northern part of the United States in winter, considerable time and effort must be expended with gloves on to perform operations not readily suited to accomplishment with cumbersome gloves on.

The instant invention is, especially in view of the foregoing, indeed new, useful and unique. With the instant invention, arduous assembly and disassembly is dispensed with. All that is required when resort to the instant invention is had for such purposes is merely a quick and simple attachment of a vacuum line and its concomitant detachment upon completion of an evacuation task. Also, the instant invention requires the use of only one hand and can be utilized virtually anywhere within the housing of a refrigeration unit to get at tubing wherever therein sought to be reached. Hence, only one person is ever needed when such evacuation undertakings are actually effectuated utilizing the instant invention. Furthermore, piercing and evacuation can be accomplished by one person in seconds rather than over a much longer period of time as is the case with currently in vogue line-tap valve units. Moreover, use of the instant invention with a gloved hand is no problem.

Likewise, the instant invention can be used over and over again without fear of seal deterioration or pin breakage that would result in significant down times awaiting pin replacement and unit repair. Also, the holes made in the tubing sought to be pierced are larger in diameter when the instant invention is so utilized than are the holes made for such purposes by currently in vogue conventional line-tap valve devices. Larger holes result in quicker, more efficient, more ergonomic irrigation of such tubing. In closing, it must be said in view of the foregoing, that the instant invention is virtually revolutionary in the field of refrigeration tubing irrigation. Its use will truly serve to promote the cause of environmental safety and at a time and manpower cost that will prove eminently affordable especially in comparison to what is currently required in such respects to accomplish such irrigation ends.

DESCRIPTION OF THE PREFERRED EMBODIMENTS

Figures 1, 2, 3, 4:
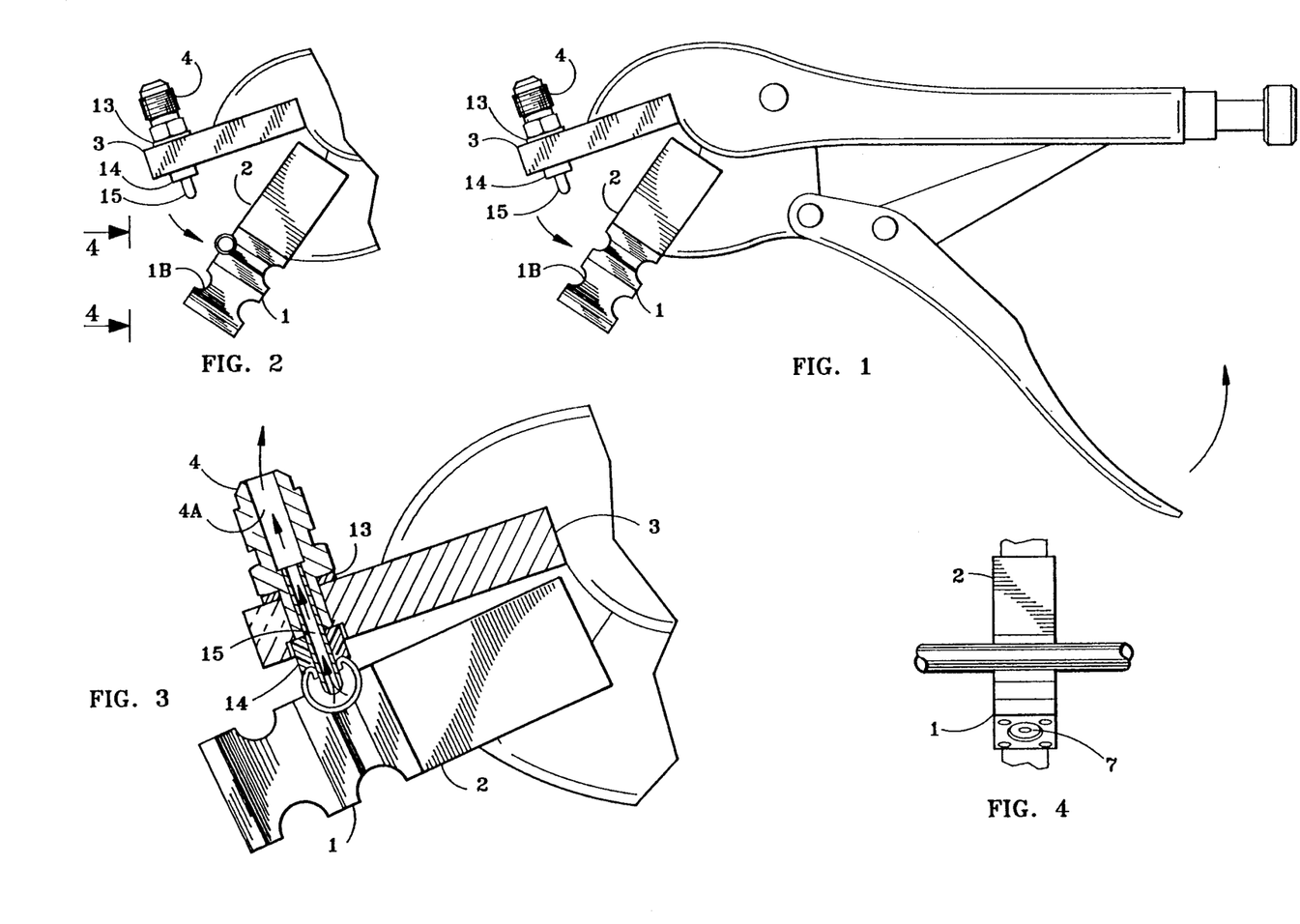
FIG. 1 shows a conventional pair of locking pliers with a tube piercing and fluid irrigation device assembly attached.
FIG. 2 shows in isolated view the upper and lower jaws of the instant tube piercing and fluid irrigation device with a piece of tubing cradled in one of the tube receiving notches in the cradle component of its lower jaw.
FIG. 3 shows in enlarged isolated view, the instant invention's tube piercing and fluid irrigation device's upper jaw tube piercing pin unit mounting plate in a cross sectional cut to show by way of arrows the flow of gas from a piece of pierced cradled tubing. Also seen in cross sectional view is the invention's piercing pin unit. There is also shown the instant invention's lower jaw's tube cradle component upon which tubing is cradled as well as its lower jaw tube cradle component mounting plate.
FIG. 4 is a perspective view showing the top of the two parts of the lower jaw of the instant invention and the tube cradle component of its lower jaw is shown cradling a piece of tubing.

FIG. 1 shows the intact invention, to wit, a uniquely modified set of conventional locking pliers. The lower jaw of the invention as therein shown is made up of a tube cradle component 1 that is attached to a lower jaw tube cradle component mounting plate 2 which is permanently fastened to the lower jaw of the locking pliers. The upper jaw of the invention as therein shown is made up of an upper jaw piercing pin unit mounting plate 3 which is permanently fastened to the upper jaw of the locking pliers. Affixed to the upper jaw piercing pin unit mounting plate 3 is the invention's piercing pin unit 4. A metallic locking washer cushion 13 is also therein shown. The purpose for the metallic locking washer cushion 13 is to facilitate orientation of the replaceable hollow press fit piercing pin 15 along the long axis of the piercing pin unit 4 in such a manner as to maximize full tube piercing action by replaceable hollow press fit piercing pin 15 with a minimum amount of slippage and concomitant bending of replaceable hollow press fit piercing pin 15. The horizontal axis of replaceable hollow press fit piercing pin 15 in situ for piercing is perpendicular to not parallel with the central long axis of fluid tubing when such tubing is held by the invention so that such tubing can then be pierced in such manner as to achieve such maximized piercing with minimum slippage, bending or tube breakage. Also therein shown is a replaceable rubber sealing gasket 14 that serves to fully encompass the point of tube penetration by replaceable hollow press fit piercing pin 15 upon engagement of the invention to thereby minimize fluid or gas leakage from the tubing containing same at the point of piercing. Tubing of any one of eight different diameters is placed into an appropriate of eight cylindrically shaped receiving notches in tube cradle component 1. Tube cradle component 1 has four frontally located cylindrically shaped receiving notches all of a different size. It also has four posteriorally located cylindrically shaped receiving notches all of a different size but two of the frontally located notches are identical in size to two of the posteriorally located notches. This situation serves to accommodate piercing of the two most common diameters of tubing without the need for reversing the mounting of tube cradle component 1 to lower jaw tube cradle component mounting plate 2. The four frontally located notches are found, one on each of four sides of the front portion of tube cradle component 1. The four posteriorly located notches are found, one on each of four sides of the back portion of tube cradle component 1. No such notches are located on either the front face or the posterior face of tube cradle component 1. The locking pliers are squeezed. The invention's upper jaw thus meets its lower jaw and hollow replaceable press fit piercing pin 15 pierces the tubing, cradled in the one of the notches located on the top side of the forward most portion of tube cradle component 1, at a point encompassed by replaceable rubber sealing gasket 14 for the purpose of effectuating evacuation of fluid specifically freon gas from the tubing.

Figure 5:
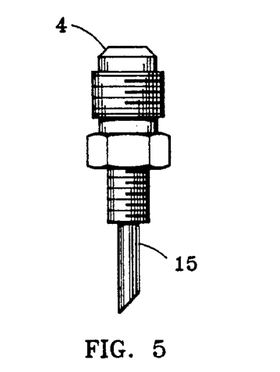
FIG. 5 is a lateral view of the instant invention's piercing pin unit.
Figure 6:
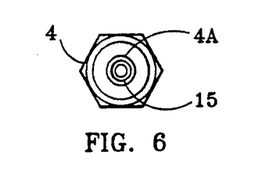
FIG. 6 is a top view of the piercing pin unit shown in FIG. 5.
Figure 7:
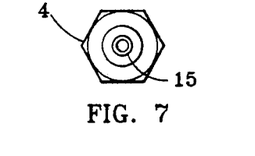
FIG. 7 is a bottom view of the piercing pin unit shown in FIG. 5.
Figure 8:
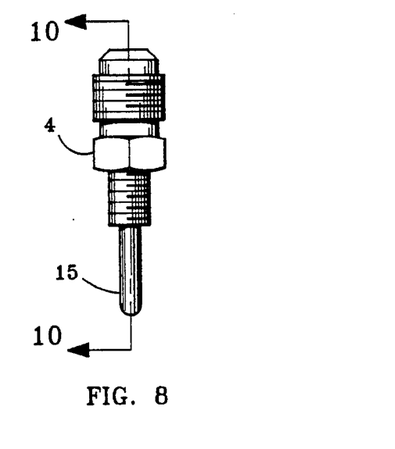
FIG. 8 is a view of the instant invention's piercing pin unit shown in FIG. 5 but turned through an angle of 90 degrees.
Figure 9:
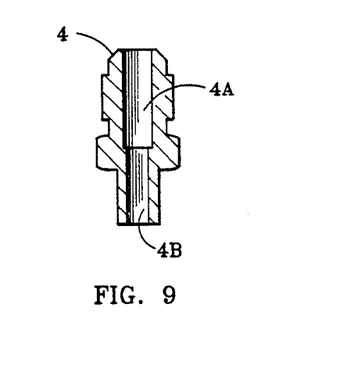
FIG. 9 is a cross-sectional view of the tube piercing unit shown in FIG. 5.
Figure 10:
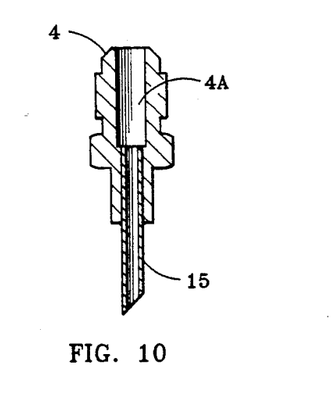
FIG. 10 is a cross-sectional view of the instant invention's piercing pin unit shown in FIG. 5 holding a replaceable hollow press fit piercing pin.
Figure 11:
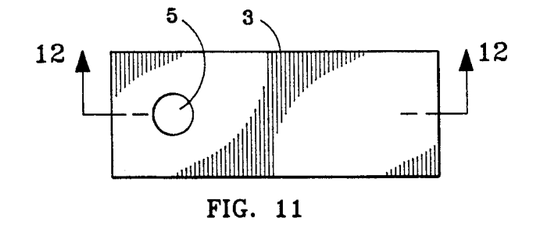
FIG. 11 is a top view of the instant invention's upper jaw, an upper jaw piercing pin unit mounting plate showing a tapped hole for receipt of the instant invention's piercing pin unit shown in FIG. 5.
Figure 12:
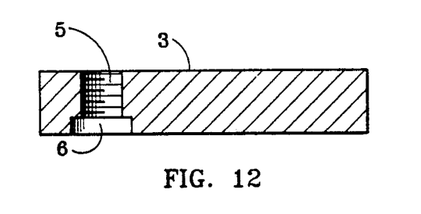
FIG. 12 is a lateral cross-sectional view of the instant invention's upper jaw, an upper jaw piercing pin unit mounting plate showing a counterbore for receipt of a sealing gasket not therein shown and showing as well the locus of a tapped hole for receipt of the invention's piercing pin unit.
Figure 13:
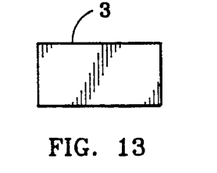
FIG. 13 is a frontal view of the instant invention's upper jaw piercing pin unit mounting plate.
Figure 14:
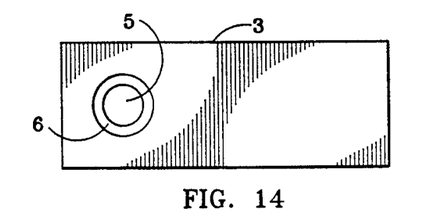
FIG. 14 is a bottom view of the instant invention's upper jaw piercing pin unit mounting plate showing the base of the sealing gasket counterbore and the based of the tapped hole both seen in FIG. 12.
Figure 15:
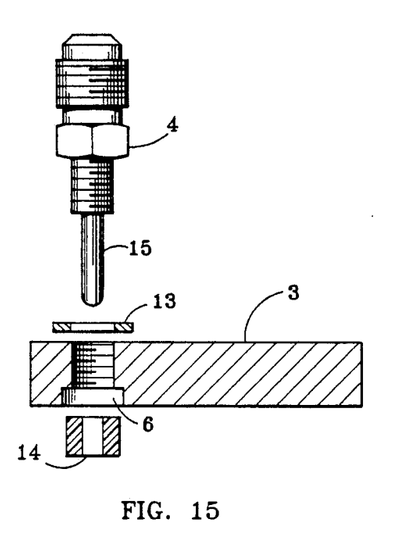
FIG. 15 shows an exploded view of the instant invention's piercing pin unit, a locking washer, the aspect of the invention shown in FIG. 12 above and a cross-sectional view of the invention's sealing gasket.
Figure 16:
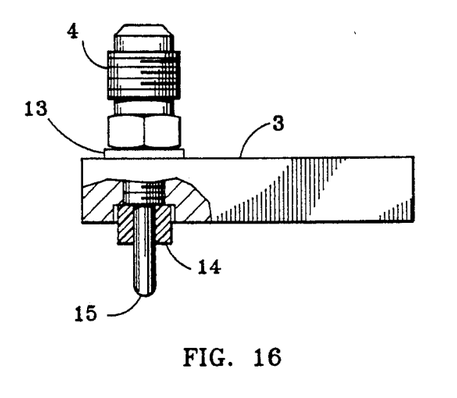
FIG. 16 is a lateral view of the assembled portions of the upper jaw of the instant invention with a broken section to evidence the interconnection of what is shown in FIG. 15 in exploded view.
Figure 17:
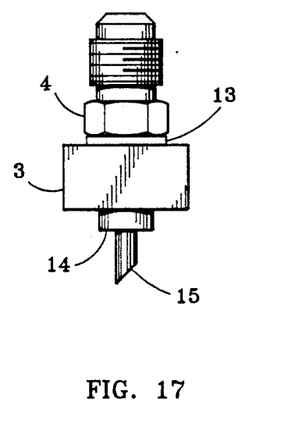
FIG. 17 is a frontal view of what is shown in FIG. 16 to better illustrate the angulated base of the instant invention's piercing pin.
Figure 18:
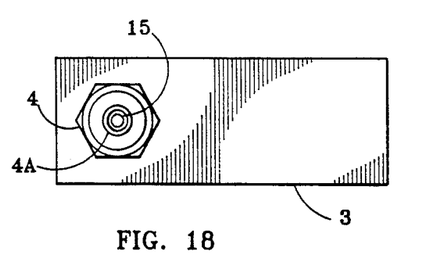
FIG. 18 is a top view of the those components of the instant invention shown in FIG. 16.
Figure 19:
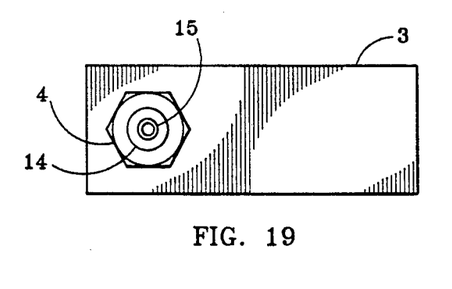
FIG. 19 is a bottom view of the those components of the instant invention shown in FIG. 16.
Figure 20:
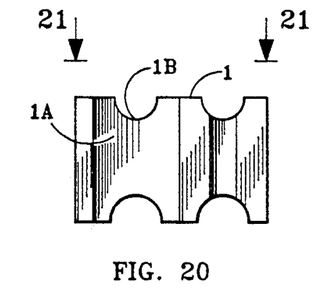
FIG. 20 is a lateral view of a part of the instant invention's lower jaw, to wit, a tube cradle component showing a plurality of different cylindrically shaped receiving notches capable of receiving tubing of different diameters.
Figure 21:
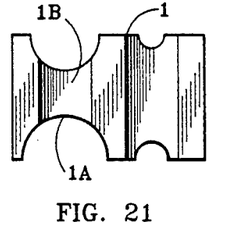
FIG. 21 is a lateral view of the tube cradle component of FIG. 19 rotated through an angle of 90 degrees.
Figure 22:
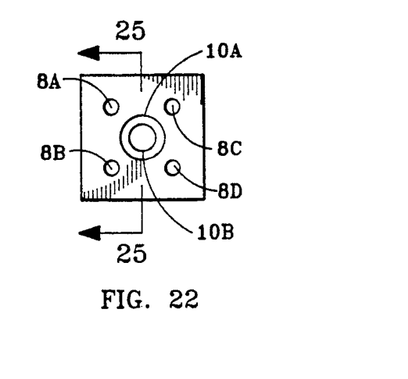
FIG. 22 is a frontal view of the part of the instant invention's lower jaw, to wit, the instant invention's tube cradle component that shows four equivalent detent screw holes for receipt of detent screws circumscribing a hole for receipt of a threaded retaining shoulder bolt.
Figure 23:
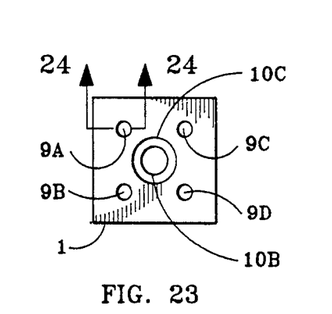
FIG. 23 is a posterior view of the tube cradle portion of the invention's lower jaw showing four equivalent detent screw holes for receiving detent screws circumscribing a hole for receiving a threaded retaining shoulder bolt.
Figure 24:
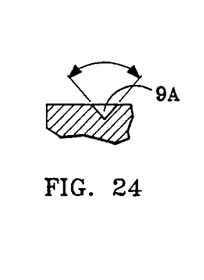
FIG. 24 is a frontal cross-sectional view of the interior of one of the eight equivalent detent screw holes shown in FIGS. 21 and 22.
Figure 25:
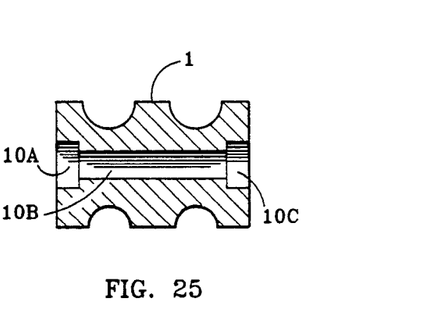
FIG. 25 is a lateral cross-sectional view of the tube cradle component of the invention's lower jaw showing two counterbores and a clearance hole for receipt of a threaded retaining shoulder bolt from either end.
Figure 26:
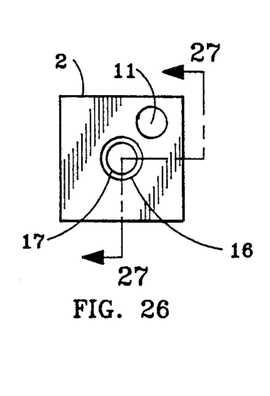
FIG. 26 is a frontal view of the posterior component of the invention's lower jaw, to wit a tube cradle component mounting plate showing its detent screw loading hole and a central hole for receipt of the end of the body of and the threaded base of a threaded retaining shoulder bolt.
Figure 27:
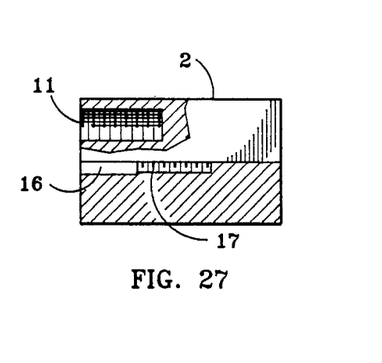
FIG. 27 is a lateral cross-sectional view of the invention's tube cradle component mounting plate showing its tapped detent screw hole and tapped shoulder bolt holes.
Figure 28:
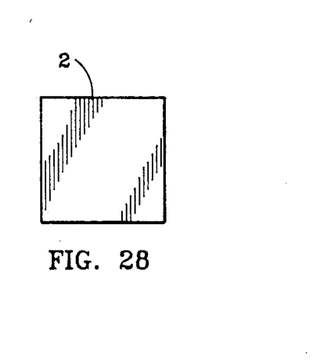
FIG. 28 is a posterior view of the tube cradle mounting plate.
Figure 29:
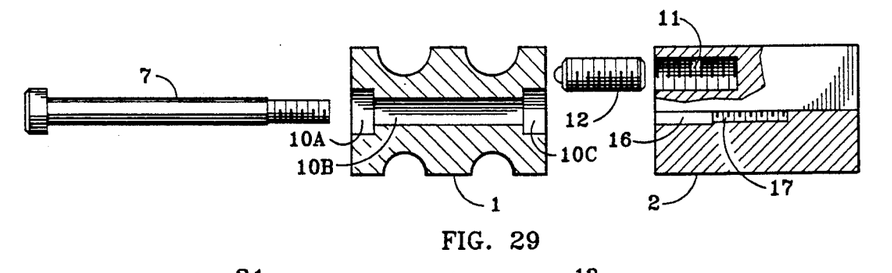
FIG. 29 shows an exploded view of a threaded retaining shoulder bolt, the lateral cross-sectional view of the tube cradle component shown in FIG. 25, a detent screw and the lateral cross-sectional view of the tube cradle component mounting plate shown in FIG. 27.
Figure 30:
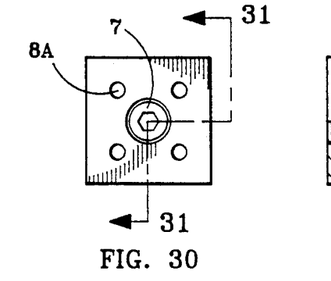
FIG. 30 is a frontal view of the invention's tube cradle component showing the head of a threaded retaining shoulder bolt therein.
Figure 31:
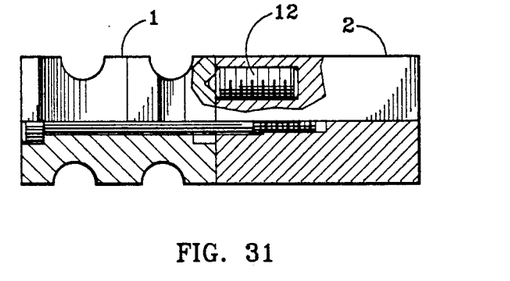
FIG. 31 shows intact the parts of the invention shown in FIG. 29.
Figure 32:
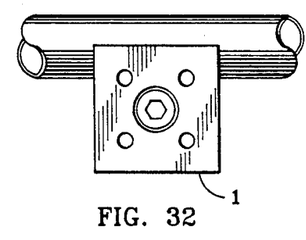
FIG. 32 shows tubing cradled in a cylindrically shaped recovery notch of the invention's tube cradle component with a threaded retaining shoulder bolt therein inserted.
Figure 33:
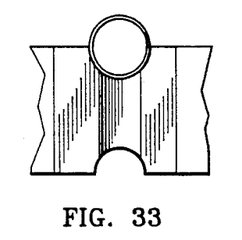
FIG. 33 is a lateral view of tubing held in one of the tube cradles eight cylindrically shaped receiving notches.
Figure 34:
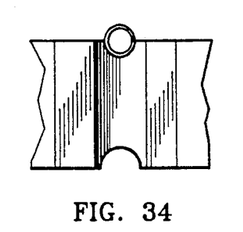
FIG. 34 is a lateral view of tubing held in another one of the tube cradles eight cylindrically shaped receiving notches.
Figure 35:
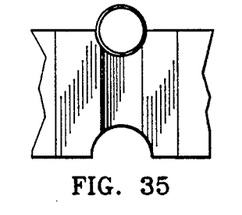
FIG. 35 is a lateral view of tubing held in yet another one of the tube cradles eight cylindrically shaped receiving notches.
Figure 36:
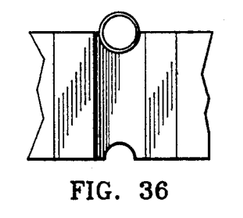
FIG. 36 is a lateral view of tubing held in still another one of the tube cradles eight cylindrically shaped receiving notches.
Figure 37:
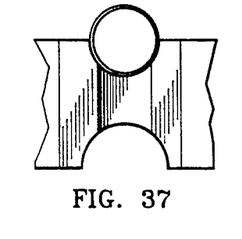
FIG. 37 is a lateral view of tubing held in yet still another one of the tube cradles eight cylindrically shaped receiving notches.
Figure 38:
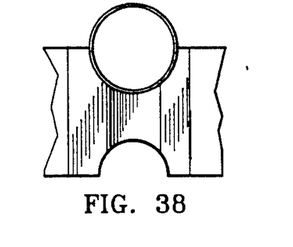
FIG. 38 is a lateral view of tubing held in yet again another one of the tube cradles eight cylindrically shaped receiving notches.

FIG. 2 is an isolated view of the essence of the invention. Tubing is seen cradled as previously noted in the appropriate one of the cylindrically shaped receiving notches as is found on the top side of the forward most portion of the tube cradle component 1 which tubing is then amenable to being pierced by replaceable hollow press fit piercing pin 15. FIG. 3 is an enlarged version of FIG. 2 but with a longitudinal cross-sectional cut through upper jaw piercing pin unit mounting plate 3 and piercing pin unit 4. A piece of tubing is shown held in the appropriate one of the eight cylindrical receiving notches of tube cradle component 1 and hollow replaceable press fit piercing pin 15 is seen piercing the tubing with replaceable rubber sealing gasket 14 encompassing the point of piercing. There are also shown arrows depicting the flow of freon gas from the tubing up through hollow replaceable press fit piercing pin 15 into piercing pin unit 4's upper housing cavity 4a. The freon gas is drawn off from cavity 4a through a hole in the top of piercing pin unit 4 by way of a pressure gradient created in a vacuum line that can readily be attached to the exterior of piercing pin unit 4. FIG. 4 is a frontal view of the invention's lower jaw as depicted in FIG. 2. Tubing is shown being cradled in the appropiate one of the eight cylindrically shaped receiving notches of tube cradle component 1 which is affixed to lower jaw tube cradle mounting plate 2. Four equivalent detent screw holes 8a, 8b, 8c and 8d in the front face of tube cradle component 1 as are later seen in FIG. 23 and the head of threaded retaining shoulder bolt 7 also in the front face of tube cradle component 1 are also shown in FIG. 4. The purpose of threaded retaining shoulder bolt 7 is to, when screwed taut, hold tube cradle component 1 fast to lower jaw tube cradle component mounting plate 2. FIG. 5 shows piercing pin unit 4, and replaceable hollow press fit piercing pin 15 in isolated view. FIG. 6 is a top view of piercing pin unit 4. FIG. 7 is a bottom view of piercing pin unit 4. FIG. 8 shows piercing pin unit 4, and hollow replaceable press fit piercing pin 15 rotated through an angle of 90 degrees. The purpose of FIG. 8 is to show the proper orientation of replaceable hollow press fit piercing pin 15 in relation to a cradled tube just before piercing. Piercing is accomplished with the tip of replaceable hollow press fit piercing pin 15 so positioned in relation to the tubing to be pierced that the line of the horizontal axis of hollow press fit piercing pin 15 is perpendicular to and not parallel with the long central axis of tubing to be pierced. Such desired alignment as is realized by way of resort to mounting adjustments via metallic locking washer cushion 13 when piercing pin unit 4 is mounted upon initial assembly to upper jaw piercing pin unit mounting plate 3 serves to minimize slippage, bending and breaking of pin 15 when piercing of tubing is accomplished upon engagement of the invention. FIG. 9 shows piercing pin unit 4 cross-sectionally. Upper housing cavity 4a is seen as is lower housing cavity 4b. Lower housing cavity 4b contains replaceable hollow press fit piercing pin 15 when same is press fit into piercing pin unit 4 as is shown in FIG. 10. FIG. 11, a top view of upper jaw piercing pin unit mounting plate 3 shows the top of a threaded tapped hole 5 for receipt of piercing pin unit 4. FIG. 12 is a lateral view of upper jaw piercing pin unit mounting plate 3. It shows threaded tapped hole 5 in lateral view as well as showing in lateral view a counterbore 6 for receipt of replaceable rubber sealing gasket 14. Upon assembly of the invention, piercing pin unit 14 is screwed taut and through metallic locking washer cushion 13 into threaded tapped hole 5, and replaceable hollow press fit pin 15 would be seen having penetrated rubber sealing gasket 14 held in counterbore 6. FIG. 13 is a frontal view of upper jaw piercing pin unit mounting plate 3. FIG. 14 is a bottom view of upper jaw piercing pin unit mounting plate 3. It shows the outer circumferences of threaded tapped hole 5 and counterbore 6 respectively. FIG. 15 shows in exploded view, piercing pin unit 4, metallic locking washer cushion 13, a lateral cross-sectional view of piercing pin unit mounting plate 3 with lateral views of threaded tapped hole 5 and counterbore 6 as well as a view of replaceable rubber sealing gasket 14 in proximity thereto. FIG. 16 shows in lateral view all of what is shown in FIG. 15. as well as showing in operational position, replaceable hollow press fit piercing pin 15. A broken lateral view of upper jaw piercing pin unit mounting plate 3 as is seen in FIG. 16 shows how all of the parts therein depicted fit together. FIG. 17 is a frontal view of what is seen in FIG. 16. FIG. 18 is a top view of what is seen in FIG. 16. FIG. 19 is a bottom view of what is seen in FIG. 16. FIG. 20 is a lateral view of tube cradle component 1. FIG. 21 is a lateral view of tube cradle component 1 that differs from FIG. 20 in that it shows tube cradle component 1 rotated through an angle of 90 degrees. Such rotation of same enables one to appreciate the existence of six different sized cylindrically shaped receiving notches and two more such notches of a size equal to two of the other six such notches all cut therein for the purpose of receiving any one of up to six different types of gas containing tubing that differ in respect of the sizes of their respective diameters. Notches 1a and 1b as depicted in these two figures facilitate visualization of such rotation. FIGS. 22 and 23 show respectively the equivalent front and posterior faces of tube cradle component 1. Both faces have detent screw holes: 8a, 8b, 8c, 8d and 9a, 9b, 9c and 9d respectively. Also therein shown are circumferences evidencing in frontal view and posterior view respectively, counterbores 10a and 10c for receipt of the head of threaded retaining shoulder bolt 7 and clearance hole 10b for receipt of the body of threaded retaining shoulder bolt 7. FIG. 24 is a broken cross-sectional view of the upper corner of either FIG. 22 or FIG. 23 showing one of the equivalent eight countersunk holes that correspond to detent screw holes 8a, 8b, 8c, 8d; 9a, 9b, 9c, and 9d respectively. FIG. 25 is a lateral cross-sectional view of tube cradle component 1 showing equivalent counterbores 10a, 10c and clearance hole 10b. FIG. 26 shows the front face of lower jaw tube cradle mounting plate 2. In the upper corner of lower jaw tube cradle mounting plate 2 is a frontal view of threaded tapped hole 11 that serves to hold in place a spring loaded detent screw 12 later shown in FIG. 29. Also shown in this figure is a centrally positioned set of holes 16 and 17 serving to receive the body and threaded portions respectively of threaded retaining shoulder bolt 7. FIG. 27 is a broken lateral view of lower jaw tube cradle mounting plate 2 showing the threaded tapped essence of hole 11 and the length of hole 16 and the threaded tapped essence of hole 17 which is but an extension of hole 16. FIG. 28 is a posterior view of lower jaw tube cradle mounting plate 2. FIG. 29 shows in exploded lateral view, threaded retaining shoulder bolt 7 in apposition to counterbore 10a and clearance hole 10b in tube cradle component 1. Spring loaded detent screw 12 is also seen in apposition to hole 11 as depicted in a lateral broken view of lower jaw tube cradle mounting plate 2. FIG. 30 shows the front face of tube cradle component 1 along with the head of threaded retaining shoulder bolt 7 screwed in place into what would be counterbore 10a. Four detent screw holes, 8a, 8b, 8c and 8d are also shown in FIG. 30. FIG. 30 could just as easily have been viewed as showing the posterior face of tube cradle component 1 with retaining shoulder bolt 7 as seen head on inserted into what would be counterbore 10c as well as then showing detent screw holes 9a, 9b, 9c and 9d. FIG. 31 is a broken lateral view of the invention's fully assembled lower jaw. FIG. 32 is a frontal or posterior view of tube cradle component 1 showing detent screw holes and the head of inserted threaded retaining shoulder bolt 7 along with a piece of cradled tubing. FIGS. 33, 34, 35, 36 and 37 show pieces of cradled tubing all of differing diameters and in lateral view as well as the eight cylindrically shaped receiving notches in tube cradle component 1.

At any given time when the invention is intact and ready to be engaged for purposes of piercing an original piece of cradled tubing, it may become the case that for whatever reason, a user of the invention may desire to pierce instead a second and different size of cradled tubing that would not fit precisely into the original cylindrically shaped receiving notch cradling the original piece of tubing. This is a problem that is readily and quickly resolvable. All that is required in order to adjust for tubing of a different size is as follows: Begin by loosening for one turn or so threaded retaining shoulder bolt 7 originally inserted into, for example, counterbore 10a, clearance hole 10b, and hole 16 and threaded into hole 17. Disengage tube cradle component 1 from its original position in apposition to lower jaw tube cradle mounting plate 2. When such disengagement occurs, the spring loaded detent screw 12 held in tapped hole 11 becomes separated from the detent screw hole 9a, or 9b, or 9c or 9d originally holding the spring loaded small head of detent screw 12. Tube cradle component 1 is then rotated either 90 degrees or 180 degrees or 270 degrees in order to locate the new appropriately cylindrically shaped receiving notch amenable to ready receipt of the second piece of tubing. Then threaded retaining shoulder bolt 7 is retightened and the invention is ready for engagement by a user. Or, if need be, to the extent that the appropriate cylindrically shaped receiving notch is not to be found amongst one of the four of such notches located in the frontal portion of tube cradle component 1, then, retaining shoulder bolt 7 is loosened and removed and then tube cradle component 1 can at that point be turned around through an angle of 180 degrees so that its posterior face is frontally located and its frontal face is posteriorly located and then rotated through an angle of 90 degrees or 180 degrees or 270 degrees to locate the appropriate one of the four cylindrically shaped receiving notches to be found in the now frontally positioned former posterior portion of tube cradle component 1. Assuming that the appropriate one of such notches would have then been located in the now former posterior portion of tube cradle component 1, then once located, threaded retaining shoulder bolt 7 is inserted into tube cradle component 1 so that the head of bolt 7 is held within counterbore 10c instead of counterbore 10a. The small spring loaded head of detent screw 12, the body of which is in hole 11 of lower jaw tube cradle mounting plate 2, is positioned into the appropriate one of detent screw holes 8a or 8b or 8c or 8d, whichever one as will result in location of the appropriate cylindrically shaped receiving notch just below the tip of replaceable hollow press fit piercing pin 15 just prior to engagement of the invention. At this juncture, threaded retaining shoulder bolt 7 is tightened and the invention is thus readied for engagement. A better understanding of the working of the invention is gained when it is borne in mind that if counterbore 10a faces frontally, then, the small spring loaded head of detent screw 12 will fit into the one of detent screw holes 9a or 9b or 9c or 9d needed in order to position the appropriate one of four frontal cylindrically shaped receiving notches needed for cradling a given diameter of tubing just below the tip of replaceable hollow press fit piercing pin 15. If, on the other hand, counterbore 10c faces frontally, then, the small springloaded head of detent screw 12 will fit into the one of detent screw holes 8a or 8b or 8c or 8d needed in order to position the appropriate one of four posterior cylindrically shaped receiving notches needed for cradling a different given diameter of tubing just below the tip of replaceable hollow press fit piercing pin 15.

Other embodiments of the invention contemplate a tube cradle component with less than eight cylindrically shaped receiving notches and correspondingly less detent screw holes for receipt of the small springloaded head of a detent screw. For example, a tube cradle component with but four cylindrically shaped receiving notches, one on each of four sides and located closer to the front face of tube cradle component and four detent screw holes located only in the posterior face of the tube cradle component could constitute part of another embodiment of the invention. Also, the tube cradle component and/or one or both of the mounting plates of the invention could be hollowed out interiorly to whatever extent one might wish to contemplate any cost savings in terms of materials to be utilized in respect of the manufacture of the same.

In conclusion, the above-described embodiment of the invention serves to illustrate its novelty, uniqueness and unquestionable usefulness. Respectfully submitted, use of the invention will from the standpoints of safety, economy and efficiency of evacuation virtually revolutionize the process of removing fluid such as freon gas from tubing containing it.

What is claimed is:

1. A tube piercing and fluid irrigatoin device, comprising:
   a. an upper jaw mounting plate with four sides, a front face and a posterior face, the top side of which is permanently fastened to the bottom face of the upper jaw of a pair of locking pliers;
   b. a threaded tapped hole through said upper jaw mounting plate from said plate's top side through said plate to said plate's bottom side for receipt of a hollow piercing pin housing unit;
   c. a upper housing cavity centrally located within and resulting in a hole in the top of said piercing pin housing unit;
   d. a lower housing cavity centrally located within said hollow piercing pin housing unit but extending from the bottom of said piercing pin housing unit to the base of said upper housing cavity;
   e. a replaceable hollow press fit piercing pin held within said lower housing cavity;
   f. a replaceable rubber sealing gasket penetrated by said replaceable hollow press fit piercing pin when said replaceable hollow press fit piercing pin is held within said lower housing cavity;
   g. a counterbored hole in the bottom side of said upper jaw mounting plate for receipt of said replaceable rubber sealing gasket the diameter of which said counterbored hole is larger than that of said tapped hole and the long axis of which said counterbored hole is coterminus with the long axis of said tapped hole;
   h. a metallic locking washer cushion resting above said tapped hole through which said cushion said piercing pin housing unit is thrust for receipt of said piercing pin housing unit by said tapped hole;
   i. a lower jaw tube cradle component mounting plate with four sides, a front face and a posterior face, the bottom side of which is, permanently fastened to the upper face of the lower jaw of said pair of locking pliers;
   j. a threaded retaining shoulder bolt;
   k. a detent screw with a springloaded head;
   l. a threaded hole in the upper corner of the front face of and extending therefrom partially into the body of said lower jaw tube cradle component mounting plate for receipt of the base and body of said detent screw with a springloaded head;
   m. a hole centrally located in the front face of and extending therefrom partially into the body of said lower jaw tube cradle component mounting plate and further extended as a threaded hole within said body for receipt of the threaded tip and part of the body of said threaded retaining shoulder bolt;
   n. a tube cradle component made up of a front portion with a front face and a back portion with a posterior face and with said front portion's said front face characterized by the presence of a plurality of detent screw holes and with said back portion's said posterior face characterized by the presence of a plurality of detent screw holes and with said front portion further characterized by the presence of four sides and a first set of cylindrically shaped notches all of different sizes arranged around the same, to wit, a first axis such that all said notches within said first set are cut into the exterior surfaces of a plurality of said front portion's said four sides in such a way that there is however no more than one said notch within said first set of notches per said side and with said back portion further characterized by the presence of four sides and a second set of cylindrically shaped notches all of different sizes arranged around the same axis, to wit, a second axis parallel to and coterminus with said first axis to thus form one common axis such that all said notches within said second set are cut into the exterior surfaces of a plurality of said back portion's said four sides in such a way that there is however no more than one said notch within said second set of notches per said side and further such that disassembly and rotation of said tube cradle component from a position whereat said tube cradle's posterior face abuts the front face of said mounting plate to a position whereat said tube cradle's front face abuts the front face of said mounting plate about an axis perpendicular to said axis and said second axis through an angle of 180 degrees can serve to operatively position any one of said notches within said second set after subsequent rotation of said tube cradle component about said first axis and said second axis through an axis of 90 degrees or 180 degrees or 270 degrees and reassembly, and further such that disassembly and rotation of said tube cradle component from a position whereat said tube cradle's front face abuts the front face of said mounting plate to a position whereat said tube cradle's posterior face abuts the front face of said mounting plate about an axis perpendicular to said first axis and said second axis through an angle of 180 degrees can serve to operatively position any one of said notches within said first set after subsequent rotation of said tube cradle component about said first axis and said second axis through an axis of 90 degrees or 180 degrees or 270 degrees;

o. a first counterbored hole for receipt of the head of said threaded retaining shoulder bolt which said counterbored hole is centrally located in the front face of and extends partially into the body of said solid tube cradle component;

p. a clearance hole extending from the end of said first counterbored hole through the body of said tube cradle component to an opening in the posterior face of said tube cradle component, the long central axis of which said clearance hole is coterminus with the central axis of said first counterbored hole;

q. a plurality of posterior detent screw holes of equivalent size located one each in one or more of each of the four corners of the posterior face of said tube cradle component for receipt by only one of said posterior detent screw holes at any one time of the springloaded head of said detent screw when said tube cradle component is held fast to said lower jaw tube cradle component mounting plate by said threaded retaining shoulder bolt tightly screwed into place.

2. A tube piercing and fluid irrigation device, comprising:

a. an upper jaw mounting plate with four sides, a front face and a posterior face, the top side of which is permanently fastened to the bottom face of the upper jaw of a pair of locking pliers;

b. a threaded tapped hole through said upper jaw mounting plate from said plate's top side through said plate to said plate's bottom side for receipt of a hollow piercing pin housing unit;

c. a upper housing cavity centrally located within and resulting in a hole in the top of said piercing pin housing unit;

d. a lower housing cavity centrally located within said hollow piercing pin housing unit but extending from the bottom of said piercing pin housing unit to the base of said upper housing cavity;

e. a replaceable hollow press fit piercing pin held within said lower housing cavity;

f. a replaceable rubber sealing gasket penetrated by said replaceable hollow press fit piercing pin when said replaceable hollow press fit piercing pin is held within said lower housing cavity;

g. a counterbored hole in the bottom side of said upper jaw mounting plate for receipt of said replaceable rubber sealing gasket the diameter of which said counterbored hole is larger than that of said tapped hole and the long axis of which said counterbored hole is coterminus with the long axis of said tapped hole;

h. a metallic locking washer cushion resting above said tapped hole through which said cushion said piercing pin housing unit is thrust for receipt of said piercing pin housing unit by said tapped hole;

i. a lower jaw tube cradle component mounting plate with four sides, a front face and a posterior face, the bottom side of which is, permanently fastened to the upper face of the lower jaw of said pair of locking pliers;

j. a threaded retaining shoulder bolt;

k. a detent screw with a springloaded head;

l. a threaded hole in the upper corner of the front face of and extending therefrom partially into the body of said lower jaw tube cradle component mounting plate for receipt of the base and body of said detent screw with a springloaded head;

m. a hole centrally located in the front face of and extending therefrom partially into the body of said lower jaw tube cradle component mounting plate and further extended as a threaded hole within said body for receipt of the threaded tip and part of the body of said threaded retaining shoulder bolt;

n. a tube cradle component made up of a front portion with a front face and a back portion with a posterior face and with said front portion's said front face characterized by the presence of a plurality of detent screw holes and with said back portion's said posterior face characterized by the presence of a plurality of detent screw holes and with said front portion further characterized by the presence of four sides and a first set of cylindrically shaped notches all of different sizes arranged around the same, to wit, a first axis such that all said notches within said first set are cut into the exterior surfaces of a plurality of said front portion's said four sides in such a way that there is however no more than one said notch within said first set of notches per said side and with said back portion further characterized by the presence of four sides and a second set of cylindrically shaped notches all of different sizes arranged around the same axis, to wit, a second axis parallel to and coterminus with said first axis to thus form one common axis such that all said notches within said second set are cut into the exterior surfaces of a plurality of said back portion's said four sides in such a way that there is however no more than one said notch within said second set of notches per said side and further such that disassembly and rotation of said tube cradle component from a position whereat said tube cradle's posterior face abuts the front face of said mounting plate to a position whereat said tube cradle's front face abuts the front face of said mounting plate about an axis perpendicular to said first axis and said second axis through an angle of 180 degrees can serve to operatively position any one of said notches within said second set after subsequent rotation of said tube cradle component about said first axis and said second axis through an axis of 90 degrees or 180 degrees or 270 degrees and reassembly, and further such that disassembly and rotation of said tube cradle component from a position whereat said tube cradle's front face abuts the front face of said mounting plate to a position whereat said tube cradle's posterior face abuts the front face of said mounting plate about an axis perpendicular to said first axis and said second axis through an angle of 180 degrees can serve to operatively position any one of said notches within said first set after subsequent rotation of said tube cradle component about said first axis and said second axis through an axis of 90 degrees or 180 degrees or 270 degrees;

o. a first counterbored hole for receipt of the head of said threaded retaining shoulder bolt which said counterbored hole is centrally located in the front face of and extends partially into the body of said tube cradle component;

p. a clearance hole extending from the end of said first counterbored hole through the body of said tube cradle component to an opening in the posterior face of said tube cradle component, the long central axis of which said clearance hole is coterminus with the central axis of said first counterbored hole;

q. a plurality of posterior detent screw holes of equivalent size located one each in one or more of each of the four corners of the posterior face of said tube cradle component for receipt by only one of said posterior detent screw holes at any one time of the springloaded head of said detent screw when said tube cradle component is held fast to said lower jaw tube cradle component mounting plate by said threaded retaining shoulder bolt tightly screwed into place.

r. a plurality of anterior detent screw holes of equivalent size located one each in one or more of each of the four corners of the anterior face of said tube cradle component for receipt by only one of said anterior detent screw holes at any one time of the springloaded head of said detent screw when said tube cradle component is held fast to said lower jaw tube cradle mounting plate by said threaded retaining shoulder bolt tightly screwed into place.

3. A tube piercing and fluid irrigation device, comprising:

a. an upper jaw mounting plate with four sides, a front face and a posterior face, the top side of which is permanently fastened to the bottom face of the upper jaw of a pair of locking pliers;

b. a threaded tapped hole through said upper jaw mounting plate from said plate's top side through said plate to said plate's bottom side for receipt of a hollow piercing pin housing unit;

c. a upper housing cavity centrally located within and resulting in a hole in the top of said piercing pin housing unit;

d. a lower housing cavity centrally located within said hollow piercing pin housing unit but extending from the bottom of said piercing pin housing unit to the base of said upper housing cavity;

e. a replaceable hollow press fit piercing pin held within said lower housing cavity;

f. a replaceable rubber sealing gasket penetrated by said replaceable hollow press fit piercing pin when said replaceable hollow press fit piercing pin is held within said lower housing cavity;

g. a counterbored hole in the bottom side of said upper jaw mounting plate for receipt of said replaceable rubber sealing gasket the diameter of which said counterbored hole is larger than that of said tapped hole and the long axis of which said counterbored hole is coterminus with the long axis of said tapped hole;

h. a metallic locking washer cushion resting above said tapped hole through which said cushion said piercing pin housing unit is thrust for receipt of said piercing pin housing unit by said tapped hole;

i. a lower jaw tube cradle component mounting plate with four sides, a front face and a posterior face, the bottom side of which is, permanently fastened to the upper face of the lower jaw of said pair of locking pliers;

j. a threaded retaining shoulder belt;

k. a detent screw with a springloaded head;

l. a threaded hole in the upper corner of the front face of and extending therefrom partially into the body of said lower jaw tube cradle component mounting plate for receipt of the base and body of said detent screw with a springloaded head;

m. a hole centrally located in the front face of and extending therefrom partially into the body of said lower jaw tube cradle component mounting plate and further extended as a threaded hole within said body for receipt of the threaded tip and part of the body of said threaded retaining shoulder bolt;

n. a tube cradle component made up of a front portion with a front face and a back portion with a posterior face and with said front portion's said front face characterized by the presence of a plurality of detent screw holes and with said back portion's said posterior face characterized by the presence of a plurality of detent screw holes and with said front portion further characterized by the presence of four sides and a first set of cylindrically shaped notches all of different sizes arranged around the same, to wit, a first axis such that all said notches within said first set are cut into the exterior surfaces of a plurality of said front portion's said four sides in such a way that there is however no more than one said notch within said first set of notches per said side and with said back portion further characterized by the presence of four sides and a second set of cylindrically shaped notches all of different sizes arranged around the same axis, to wit, a second axis parallel to and coterminus with said first axis to thus form one common axis such that all said notches within said second set are cut into the exterior surfaces of a plurality of said back portion's said four sides in such a way that there is however no more than one said notch within said second set of notches per said side and further such that disassembly and rotation of said tube cradle component from a position whereat said tube cradle's posterior face abuts the front face of said mounting plate to a position whereat said tube cradle's front face abuts the front face of said mounting plate about an axis perpendicular to said first axis and said second axis through an angle of 180 degrees can serve to operatively position any one of said notches within said second set after subsequent rotation of said tube cradle component about said first axis and said second axis through an axis of 90 degrees or 180 degrees or 270 degrees and reassembly, and further such that disassembly and rotation of said tube cradle component from a position whereat said tube cradle's front face abuts the front face of said mounting plate to a position whereat said tube cradle's posterior face abuts the front face of said mounting plate about an axis perpendicular to said first axis and said second axis through an angle of 180 degrees can serve to operatively position any one of said notches within said first set after subsequent rotation of said tube cradle component about said first axis and said second axis through an axis of 90 degrees or 180 degrees or 270 degrees;

o. a first counterbored hole for receipt of the head of said threaded retaining shoulder bolt which said counterbored hole is centrally located in the front face of and extends partially into the body of said tube cradle component;

p. a clearance hole extending from the end of said first counterbored hole through the body of said tube cradle component to an opening in the posterior face of said tube cradle component, the long central axis of which said clearance hole is coterminus with the central axis of said first counterbored hole;

q. a plurality of posterior detent screw holes of equivalent size located one each in one or more of each of the four corners of the posterior face of said tube cradle component for receipt by only one of said posterior detent screw holes at any one time of the springloaded head of said detent screw when said tube cradle component is held fast to said lower jaw tube cradle component mounting plate by said threaded retaining shoulder bolt tightly screwed into place.

r. a plurality of anterior detent screw holes of equivalent size located one each in one or more of each of the four corners of the anterior face of said tube cradle component for receipt by only one of said anterior detent screw holes at any one time of the springloaded head of said detent screw when said tube cradle component is held fast to said lower jaw tube cradle mounting plate by said threaded retaining shoulder bolt tightly screwed into place.

s. a second counterbored hole for receipt of the head of said threaded retaining shoulder bolt which said second counterbored hole is centrally located in the posterior face of and extending into the body of said tube cradle component, the central axis of which said second counterbored hole is coterminus with the central axes of said clearance hole and said first counterbored hole with the end of said clearance hole extending from the end of said second counterbored hole to the end of said first counterbored hole.

4. The tube piercing and fluid irrigation device of claim 1, whereby said replaceable hollow press fit piercing pin is positionally adjusted for most efficient piercing of a piece of fluid filled tubing cradled in one of said cylindrically shaped receiving notches by way of rotationally adjusting said metallic locking washer cushion.

5. The tube piercing and fluid irrigation device of claim 2, whereby said replaceable hollow press fit piercing pin is positionally adjusted for most efficient piercing of a piece of fluid filled tubing cradled in one of said cylindrically shaped receiving notches by way of rotationally adjusting said metallic locking washer cushion.

6. The tube piercing and fluid irrigation device of claim 3, whereby said replaceable hollow press fit piercing pin is positionally adjusted for most efficient piercing of a piece of fluid filled tubing cradled in one of said cylindrically shaped receiving notches by way of rotationally adjusting said metallic locking washer cushion.

7. The tube piercing and fluid irrigation device of claim 1, whereby there is in said tube cradle component not only said first counterbored hole centrally located in the front face of said tube cradle component but also a second counterbored hole for receipt of the head of said threaded retaining shoulder bolt which said second counterbored hole equivalent in size to said first counterbored hole is centrally located in the posterior face of and extends partially into the body of said tube cradle component and the central axis of which said second counterbored hole is coterminus with the long central axis of said clearance hole and central axis of said first counterbored hole, and with said clearance hole extending from the end of said second counterbored hole to the end of said first counterbored hole.

8. The tube piercing and fluid irrigation device of claim 2, whereby there is in said tube cradle component not only said first counterbored hole centrally located in the front face of said tube cradle component but also a second counterbored hole for receipt of the head of said threaded retaining shoulder bolt which said second counterbored hole equivalent in size to said first counterbored hole is centrally located in the posterior face of and extends partially into the body of said tube cradle component and the central axis of which said second counterbored hole is coterminus with the long central axis of said clearance hole and central axis of said first counterbored hole, and with said clearance hole extending from the end of said second counterbored hole to the end of said first counterbored hole.

9. The tube piercing and fluid irrigation device of claim 1, whereby a plurality of anterior detent screw holes of equivalent size are located one each in each of one or more of the four corners of the front face of said tube cradle component for receipt by only one of said anterior detent screw holes at any one time of the springloaded head of said detent screw when said tube cradle component is held fast to said lower jaw tube cradle mounting plate by said threaded retaining shoulder bolt tightly screwed into place.

10. The tube piercing and fluid irrigation device of claim 1, whereby the said front face and the said posterior face of said tube cradle component each have one centrally positioned counterbored hole both of which said counterbored holes are equivalent in size with central axes coterminus with the long central axis of said clearance hole, and as well a plurality of equivalent small detent screw holes positioned one each in one or more of the four corners of said front face and said posterior face of said tube cradle component.

11. The tube piercing and fluid irrigation device of claim 1 whereby said tube cradle component, said upper jaw mounting plate and said lower jaw tube cradle component mounting plate are all totally solid throughout.

12. The tube piercing and fluid irrigation device of claim 2 whereby said tube cradle component, said upper jaw mounting plate and said lower jaw tube cradle component mounting plate are all totally solid throughout.

13. The tube piercing and fluid irrigation device of claim 3 whereby said tube cradle component, said upper jaw mounting plate and said lower jaw tube cradle component mounting plate are all totally solid throughout.

14. The tube piercing and fluid irrigation device of claim 1 whereby said tube cradle component, said upper jaw mounting plate and said lower jaw tube cradle component mounting plate are all hollowed out interiorally.

15. The tube piercing and fluid irrigation device of claim 2 whereby said tube cradle component, said upper jaw mounting plate and said lower jaw tube cradle component mounting plate are all hollowed out interiorally.

16. The tube piercing and fluid irrigation device of claim 3 whereby said tube cradle component, said upper jaw mounting plate and said lower jaw tube cradle component mounting plate are all hollowed out interiorally.

* * * * *